(12) United States Patent
Raether et al.

(10) Patent No.: US 6,433,070 B1
(45) Date of Patent: Aug. 13, 2002

(54) FILLER-CONTAINING BINDER COMPOSITION, ITS PREPARATION AND ITS USE

(75) Inventors: Benedikt Raether, Limburgerhof; Ulrike Hees, Mannheim; Ria Kress, Ludwigshafen; Albert Kohl, Laumersheim, all of (DE); Richard Bradshaw, Tucson, AZ (US); Gerhard Maier, München (DE)

(73) Assignee: Emtec Magnetics GmbH (DE)

( * ) Notice: Subject to any disclaimer, the term of this patent is extended or adjusted under 35 U.S.C. 154(b) by 0 days.

(21) Appl. No.: 09/661,795

(22) Filed: Sep. 14, 2000

(30) Foreign Application Priority Data

Sep. 22, 1999 (DE) .......................................... 199 45 401

(51) Int. Cl.[7] .......................... C08L 75/06; C08L 75/08
(52) U.S. Cl. ...................... 524/507; 524/537; 524/539; 524/540; 524/612
(58) Field of Search .................. 524/500, 612, 524/507, 537, 539, 540

(56) References Cited

U.S. PATENT DOCUMENTS

| 4,131,731 A | 12/1978 | Lai |
| 5,082,737 A | 1/1992 | Bobrich |

FOREIGN PATENT DOCUMENTS

| DE | 1 044 405 | 11/1958 |
| DE | 41 03 170 | 8/1992 |
| DE | 196 26824 | 1/1998 |
| EP | 681 289 | 11/1995 |
| GB | 1285710 | 8/1972 |

OTHER PUBLICATIONS

Mac.Chem.Phys.197,3067–3090 (1996) Maier.

*Primary Examiner*—Kriellion A. Sanders
(74) *Attorney, Agent, or Firm*—Keil & Weinkauf

(57) ABSTRACT

A binder composition, at least containing an inorganic filler and a thermoplastic block copolyurethane having in each case at least one soft segment (A) and at least one hard segment (B), at least one hard segment (B) containing a structural element of the formula I

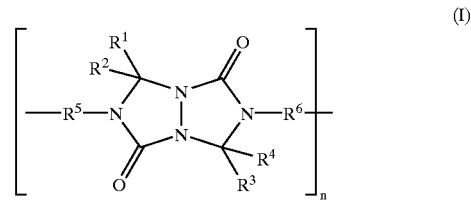

is used in particular for the production of magnetic recording media.

13 Claims, No Drawings

FILLER-CONTAINING BINDER COMPOSITION, ITS PREPARATION AND ITS USE

The invention relates to a binder composition, at least containing an inorganic filler and a thermoplastic block copolyurethane having in each case at least one soft segment (A) and at least one hard segment (B), at least one hard segment (B) containing a structural element of the formula I

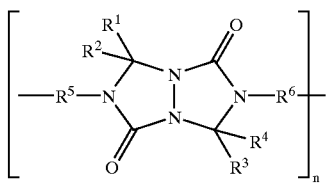

a process for the preparation of such a binder composition and its use, in particular for the production of magnetic recording media.

Various groups of substances are known to be suitable as binders in magnetic recording media. The polyurethanes, which in particular substantially improve the resilience of the magnetic recording media or of coatings of such magnetic recording media, have proven particularly advantageous to date. In the case of the polyurethanes, however, their poor hardness and abrasion resistance have frequently proven disadvantageous.

This problem is described, for example, in German Patent Application 19626824.9. Although the polyurethanes obtainable according to this publication have substantially improved values with respect to hardness and abrasion resistance, the stability of the recording might decline under specific conditions, for example at elevated storage or operating temperatures.

To counteract these problems, the polyurethanes used in magnetic recording media were provided, for example, with ionic anchor groups. Thus, EP-A 0 681 289 describes ionic phosphonates which are suitable for use in binders for magnetic recording media. The publication describes polyurethanes which contain such ionic phosphonates and their use in magnetic recording media. However, the disadvantage of such polyurethanes carrying ionic anchor groups is that, as a rule, they exhibit high water absorption, in particular at elevated temperatures and high atmospheric humidity. With increasing water absorption, however, the glass transition temperature of the magnetic recording medium is reduced, which as a rule can lead to increased abrasion and tack of the tapes and finally to deposits on the read head and to data loss when such polyurethanes are used in magnetic recording media, for example in tapes.

There was therefore a need for binders or binder compositions which can be used, for example, for the production of magnetic recording media and avoid the abovementioned disadvantages.

It is an object of the present invention to provide such binders or binder compositions.

We have found that this object is achieved by a binder composition which contains at least one inorganic filler and one thermoplastic block copolyurethane having at least one soft segment (A) and at least one hard segment (B).

The present invention therefore relates to a binder composition, at least containing an inorganic filler and a thermoplastic block copolyurethane or a mixture of two or more thermoplastic block copolyurethanes having at least one soft segment (A) and at least one hard segment (B), at least one hard segment having a structural element of the formula I

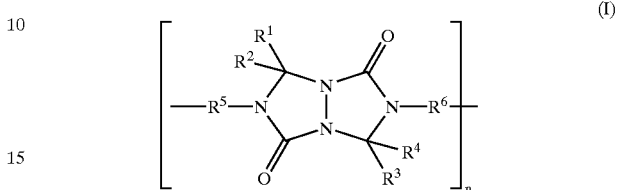

where $R^1$ and $R^3$ are identical or different, substituted or unsubstituted aromatic or heteroaromatic radicals of 4 to 40 carbon atoms and $R^2$ and $R^4$ are hydrogen or $R^1$, $R^2$, $R^3$ and $R^4$ are essentially completely fluorinated alkyl groups of 1 to 10 carbon atoms, $R^5$ and $R^6$ are identical or different, substituted or unsubstituted, linear or branched aliphatic or unsubstituted or substituted cycloaliphatic or unsubstituted or substituted aromatic radicals of 4 to 40 carbon atoms and n is from 1 to 100.

As used for the purposes of the present text, the term binder composition relates to compositions which contain at least one binder and at least one inorganic filler.

For the purposes of the present invention, a binder is understood as meaning a polymer or a mixture of two or more polymers which are substantially involved in the composition of the magnetic storage medium after chemical or physical drying is complete. In the context of the present invention, a binder may contain, for example, only one polymer, i.e. a specific type of polymer molecules, individual molecules of this type differing only in their different molecular weight which is established in a molecular weight distribution obtained by the chosen polymerization method. The chemical composition of such polymer molecules is essentially identical when only a single type of polymer molecule is present in the binder. However, the binder according to the present invention may also have two or more different types of polymer molecules. Different types of polymer molecules may differ, for example, in their molecular weight distribution, in their molecular weight or in their chemical composition. However, it is also possible for the different types of polymer molecules to differ in two or more of said properties.

For the purposes of the present invention, a hard segment is understood as meaning a segment of a thermoplastic polyurethane molecule, the hard segment having a glass transition temperature of at least about 50° C.

For the purposes of the present invention, a soft segment is understood as meaning a segment of a polyurethane molecule which is linked covalently to a hard segment and has a glass transition temperature which is below the temperature of use of a magnetic recording medium produced from the novel polymer, for example less than about 30° C., preferably less than about 20° C.

For the purposes of the present invention, an anchor group is understood as meaning a functional group which is capable of interacting with ionic or nonionic, polar compounds. In particular, anchor groups are understood as meaning those functional groups which are capable of interacting with the surface of inorganic filler materials, in particular with the surface of inorganic magnetic or magnetizable pigments.

In the text below, the thermoplastic block copolyurethanes used for the purposes of the present invention are referred to as thermoplastic polyurethanes or simply as polyurethanes for the sake of simplicity. Polyurethanes which do not have thermoplastic properties or are not block copolymers are expressly indicated as such below.

For the purposes of the present invention, an inorganic filler is understood as meaning a particulate filler which has a particle size of from about 100 nm to about 1 mm. Suitable inorganic fillers are, for example, chalk, titanium dioxide, silica and further minerals correspondingly processible to give particles, or metals, carbon black or in particular magnetic or magnetizable pigments, for example oxide pigments, such as $\gamma$-$Fe_2O_3$, $\gamma$-$Fe_3O_4$, $CrO_2$, or Co-modified $Fe_2O_3$, or metallic pigments, such as Fe, Co and Ni. As is generally known, further elements or compounds can be mixed with said pigments.

The thermoplastic polyurethanes contained in the novel binder compositions have in each case at least one hard segment (B) which has at least one structural element of the formula I

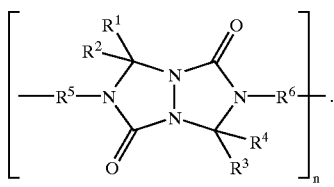

Here, $R^1$ and $R^3$ are identical or different, substituted or unsubstituted aromatic or heteroaromatic radicals of 4 to 40 carbon atoms and $R^2$ and $R^4$ are hydrogen or $R^1$, $R^2$, $R^3$ and $R^4$ are essentially completely fluorinated alkyl groups of 1 to 10 carbon atoms.

In a preferred embodiment of the present invention, $R^2$ and $R^4$ are one or two of the following radicals:

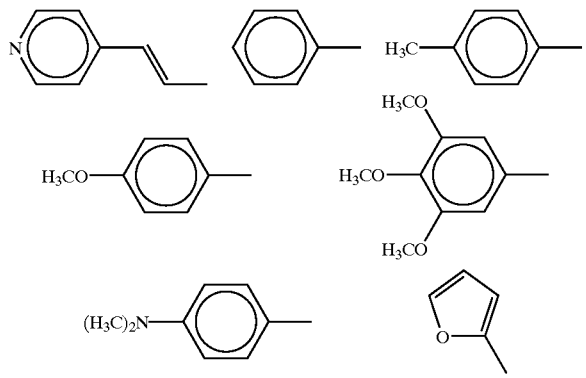

In a further preferred embodiment of the present invention, $R^2$ and $R^4$ are identical. In another preferred embodiment of the invention, $R^2$ and $R^4$ are methoxyphenyl or trimethoxyphenyl. In a further preferred embodiment of the invention, $R^2$ and $R^4$ are hydrogen.

For the purposes of the present invention, $R^5$ and $R^6$ are identical or different, substituted or unsubstituted, linear or branched aliphatic or unsubstituted or substituted cycloaliphatic or unsubstituted or substituted aromatic radicals of about 4 to about 40 carbon atoms. Suitable aliphatic radicals are, for example, butylene, pentylene, hexylene, heptylene, octylene, nonylene, decylene and the higher homologs of this series, as can be obtained by extending said hydrocarbon chains by in each case one $CH_2$ group. Other suitable radicals $R^5$ and $R^6$ are divalent aliphatic cyclic radicals, such as cyclohexylene, dicyclohexylmethylene or 3,3,5-trimethylcyclohexylene.

In a preferred embodiment of the present invention, $R^5$ and $R^6$ are unsubstituted or substituted identical or different linear or branched aliphatic radicals of 4 to 10 carbon atoms or unsubstituted or substituted aromatic radicals of 6 to 18 carbon atoms.

In a preferred embodiment of the invention, $R^5$ and $R^6$ are toluylene, tetramethylxylylene, naphthylene, tetrahydronaphthylene or diphenylenemethane.

The preparation of hard segments (B) as present in the thermoplastic polyurethanes for the purposes of the present invention is carried out by criss-cross cycloaddition between an azine and two polyisocyanates. For the purposes of the present invention, it is preferable to use diisocyanates as polyisocyanates, but it is also possible to use isocyanates having a functionality of more than 2 or mixtures thereof. For the preparation of the thermoplastic polyurethanes which can be used in the novel binder compositions, in particular for the preparation of the hard segments (B) contained in these thermoplastic polyurethanes, azines of the formula III

where $R^1$ and $R^2$ have the abovementioned meanings, are used. In a preferred embodiment of the invention, as stated above in the discussion of $R^1$ and $R^2$, p-methoxybenzaldazine or trimethoxybenzaldazine is used as the azine of the formula III. In a preferred embodiment of the invention, the reaction of the azine of the formula III to give the corresponding hard segment (B) is carried out using a polyisocyanate or a mixture of two or more polyisocyanates.

By an appropriate choice of the stoichiometric ratio of azines to diisocyanates, it is possible to prepare oligomeric or polymeric compounds which, according to the above reaction scheme, have two terminal isocyanate groups. Such compounds are of the formula II

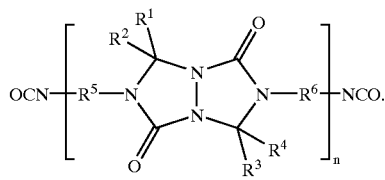
(II)

The molecular weights of the polymeric diisocyanates of the formula II which are thus obtainable and are suitable for the preparation of hard segments (B) in the thermoplastic polyurethanes can, for the purposes of the present invention, be from about 500 to about 30,000. Depending on the azines used and on the diisocyanates used, different molecular weights can be realized. In a preferred embodiment of the invention, the compounds of the formula II which are used for the preparation of the hard segments (B) have a molecular weight of from about 1000 to about 20,000, for example from about 1100 to about 18,000. In a further preferred embodiment of the invention, the compounds of the formula II which are used for the preparation of the hard segments (B) have a molecular weight of about 1200 to about 5000, in particular from about 1300 to about 3000.

In principle, all diisocyanates which, in the reaction with an azine, lead to polymeric diisocyanates of the formula II which fulfill the abovementioned specifications are suitable for the preparation of the compounds of the formula II. In a preferred embodiment of the invention, for example, linear aliphatic isocyanates, such as tetramethylene 1,4-diisocyanate, pentamethylene 1,5-diisocyanate or hexamethylene 1,6-diisocyanate, aliphatic cyclic diisocyanates, such as cyclohexylene 1,4-diisocyanate, dicyclohexylmethane diisocyanate or isophorone diisocyanate (IPDI), are used. Other diisocyanates suitable for the purposes of the present invention are aromatic diisocyanates, such as toluylene 2,4-diisocyanate (2,4-TDI), toluylene 2,6-diisocyanate (2,6-TDI), the isomer mixture of the two last-mentioned diisocyanates, m-tetramethylxylylene diisocyanate (TMXDI), p-tetramethylxylylene diisocyanate, naphthylene 1,5-diisocyanate, tetrahydronaphtylene 1,5-diisocyanate, diphenylmethane 2,2'-diisocyanate, diphenylmethane 2,4'-diisocyanate and diphenylmethane 4,4'-diisocyanate, and mixtures of two or more said diisocyanates. It is of course possible and envisaged for the purposes of the present invention to use a mixture of two or more azines or a mixture of two or more diisocyanates, or both, in the reaction between azines and diisocyanates. In this case, compounds of the formula II which may have different radicals $R^1$ and $R^3$ as well as $R^5$ and $R^6$ result. In a preferred embodiment of the invention, however, the compounds of the formula II have identical radicals $R^1$ and $R^3$ as well as $R^5$ and $R^6$.

Suitable processes for the preparation of compounds of the formula II are described, for example, in the publication by G. Maier, Polymers by 1,3-dipolar cycloaddition reactions: the "criss-cross" cycloaddition, *Macromol. Chem. Phys.* 197 (1996), 3067–3090, which is part of the disclosure of the present text, in particular with respect to the disclosure on pages 3078–3088.

For the purposes of the present invention, for the preparation of a thermoplastic polyurethane which has a structural element of the formula I in the hard segment (B), a compound of the formula II is reacted with a compound which is suitable as soft segment (A) and has at least two functional groups Y which are reactive toward the isocyanate groups of the compound of the formula II with formation of a covalent bond.

The novel polyurethane contains at least one type of soft segment A. For the purposes of the present invention, however, it is also possible for the thermoplastic polyurethane to contain two or more different types of soft segments A. The two or more different types of soft segments A may be, for example, identical soft segments, i.e. soft segments which have an essentially identical chemical composition. However, it is also possible for the purposes of the present invention for two or more different soft segments A to be used. Thus, the thermoplastic polyurethane used in a novel binder may have, for example, a polyester and a polyether as soft segments A.

In principle, suitable soft segments A are all polymers which dissolve in the solvents used and preferably have a $T_g$ of less than 20° C. Examples are polyesters, polyethers, polyacetals, polycarbonates, polyesterethers and the like.

Said compounds suitable for use as soft segments A have at least one functional group Y. In a preferred embodiment of the invention, the compounds suitable as soft segments A have at least two functional groups Y. In a further preferred embodiment of the invention, the functional groups Y are attached terminally to the compounds suitable for use as soft segment A.

In principle, Y is a functional group which is capable of reacting with an NCO group with formation of a covalent bond. In a preferred embodiment of the invention, Y is OH, $NH_2$, NHR, SH or COOH, where R is a linear or branched, saturated or unsaturated alkyl radical of 1 to 24 carbon atoms or an aryl radical of 6 to 24 carbon atoms.

In a further preferred embodiment of the invention, Y is an OH, NH or NR group, in particular an OH group. In the further course of the text, compounds suitable for the preparation of soft segments A are described. For the sake of clarity, the compounds are OH-carrying compounds, unless stated otherwise. However, for the purposes of the present invention, it is also possible to use corresponding compounds which, instead of the OH group stated in the further description, carry another functional group which is reactive toward NCO groups, for example one of the other functional groups stated for Y, if a corresponding compound exists or can be prepared.

Polyesters suitable for the formation of soft segments are, for example, predominantly linear polymers having terminal OH groups, preferably those having two or three, in particular having two terminal OH groups. The polyesterpolyols can be prepared in a simple manner by esterifying linear or branched, saturated or unsaturated aliphatic or correspondingly suitable aromatic dicarboxylic acids of 4 to about 15, preferably 4 to about 10, carbon atoms with glycols, preferably glycols of about 2 to about 25 carbon atoms or by polymerizing lactones of about 3 to about 20 carbon atoms. Dicarboxylic acids which may be used are, for example, glutaric-acid, pimelic acid, suberic acid, sebacic acid, dodecanedioic acid and preferably adipic acid or succinic acid, or mixtures of two or more said dicarboxylic acids. Suitable aromatic dicarboxylic acids are terephthalic acid, isophthalic acid, phthalic acid or mixtures of two or more of these dicarboxylic acids. Mixtures of one or more of said aromatic dicarboxylic acids with aliphatic or further aromatic dicarboxylic acids, for example with diphenic acid, pentadienoic acid, succinic acid or adipic acid, are also suitable.

For the preparation of the polyesterpolyols, it may be advantageous, instead of the dicarboxylic acids, to use corresponding acid derivatives, such as carboxylic anhydrides, esters, in particular methyl esters, or carbonyl chlorides, if these are obtainable.

The polyesterpolyols suitable for the purposes of the present invention for use as a soft segment can be prepared by reacting dicarboxylic acids with corresponding glycols. Glycols suitable in principle for the preparation of the polyesterpolyols are linear or branched, saturated or unsaturated, aliphatic or aromatic glycols. Examples of these are diethylene glycol, 1,2-ethanediol, 1,3-propanediol, 2-methyl-1,3-propanediol, 1,4-butanediol, 1,5-pentanediol, 1,6-hexanediol, 1,7-heptanediol, 1,8-octanediol, 1,9-nonanediol, 1,10-decanediol and the corresponding higher homologs, as can be formed by stepwise extension of the carbon chain of said compounds, and, for example, 2,2,4-trimethyl-1,5-pentanediol, 2,2-dimethyl-1,3-propanediol, 1,4-dimethylolcyclohexane, 1,4-diethanolcyclohexane, 2-methyl-2-butyl-1,3-propanediol, 2,2-dimethyl-1,4-butanediol, 1,4-dimethylolcyclohexane, neopentylglycol hydroxypivalate, diethylene glycol, triethylene glycol, methyldiethanolamine or aromatic-aliphatic or aromatic-cycloaliphatic diols of 8 to 30 carbon atoms, it being possible to use, as aromatic structures, heterocyclic ring systems or preferably isocyclic ring systems, such as naphthalene or in particular benzene derivatives, such as bisphenol A, symmetrically diethoxylated bisphenol A, symmetrically dipropoxylated bisphenol A, more highly ethoxylated or propoxylated bisphenol A derivatives or bisphenol F derivatives, the hydrogenation products of said bisphenol A and bisphenol F derivatives or the products of the corresponding reaction of a compound or a mixture of two or more of said compounds with an alkylene oxide of two to about 8 carbon atoms or a mixture of two or more such alkylene oxides.

In a preferred embodiment of the invention, 1,2-ethanediol, 1,3-propanediol, 2-methyl-1,3-propanediol, 1,4-butanediol, 1,6-hexanediol, 2,2-dimethyl-1,3-propanediol, 1,4-dimethylolcyclohexane, 1,4-diethanolcyclohexane and ethoxylated or propoxylated products of 2,2-bis(4-hydroxyphenylene)propane (bisphenol A) are used. Depending on the desired properties of the thermoplastic polyurethanes provided with corresponding soft segments, said polyesterpolyols can be used alone or as a mixture of two or more of said polyesterpolyols in various ratios for the preparation of the thermoplastic polyurethanes. Suitable lactones for the preparation of the polyesterpolyols are, for example, α, α-dimethyl-γ-propiolactone, β-butyrolactone and ε-caprolactone.

Also suitable for use as soft segments A in the preparation of the abovementioned thermoplastic polyurethanes are the polyetherpolyols. Polyetherpolyols are understood as meaning essentially linear substances having ether bonds, which possess terminal OH groups in the context of the above. Suitable polyetherpolyols can be prepared, for example, by polymerizing cyclic ethers, such as tetrahydrofuran, or by reacting one or more alkylene oxides having 2 to 4 carbon atoms in the alkylene radical with an initiator molecule which has two active hydrogen atoms. Examples of suitable alkylene oxides are ethylene oxide, 1,2-propylene oxide, epichlorohydrin, 1,2-butylene oxide or 2,3-butylene oxide or mixtures of two or more thereof.

Suitable polyesterpolyols and polyetherpolyols and their preparation are described, for example, in EP-B 0 416 386.

For the purposes of the present invention, for example, polycarbonates too can be used as soft segments A. In a preferred embodiment of the invention, polycarbonates which are essentially linear and have at least two, preferably terminal, OH groups are used. The preparation of corresponding polycarbonatepolyols is carried out, for example, by reacting one of the abovementioned difunctional alcohols or a mixture of two or more such difunctional alcohols with phosgene. Suitable polycarbonatepolyols, for example those based on 1,6-hexanediol, and their preparation are described, for example, in U.S. Pat. No. 4,131,731.

For example, aliphatic alcohols having three or more functional groups and 3 to about 15, preferably about 3 to about 10, carbon atoms can be used in the preparation of the soft segments, in amounts of up to about 5% by weight, based on the total mass of the soft segments contained in the thermoplastic polyurethane. Correspondingly suitable compounds are, for example, trimethylolpropane, triethylolpropane, glycerol, pentaerythritol, sorbitol, mannitol and further sugar alcohols having up to about 10 OH groups per molecule. Also suitable for the preparation of the soft segments are the corresponding derivatives of said compounds, as can be obtained by reaction with an alkylene oxide of 2 to about 4 carbon atoms or a mixture of two or more such alkylene oxides. In a further variant, carboxylic acids or derivatives thereof having three or more functional groups can also be used. Said compounds can be used in each case alone or as a mixture of two or more of said compounds.

In a preferred embodiment of the invention, for example, polyesters which are obtainable from a reaction of adipic acid or isophthalic acid and/or a mixture thereof with 1,6-hexanediol or cyclohexanedimethanol or a mixture thereof are used as soft segment (A).

In a preferred embodiment of the invention, the soft segments (A) have glass transition temperatures of from about −50 to about 20° C. In a further preferred embodiment of the invention, the glass transition temperatures of the soft segments (A) are from about −30 to about 0° C. In order to ensure the desired mechanical properties of the novel binder, the soft segment (A) should have a molecular weight of from about 500 to about 25,000 g/mol. In a preferred embodiment of the invention, soft segments (A) which have a molecular weight of from about 2000 to about 10,000, for example from about 3000 to about 7000, g/mol are used.

Compounds suitable for use as soft segments (A) and belonging to the abovementioned classes of compounds may already be present in a molecular weight range suitable for use as soft segment (A). However, it is also possible to use, for the preparation of soft segments (A), those compounds of the abovementioned classes of compounds which have a molecular weight which is below the molecular weight suitable for use as soft segment (A) or below the desired molecular weight. In this case, it is possible for the purposes of the present invention to extend such compounds of the abovementioned classes of compounds by reaction with corresponding difunctional compounds or compounds having a higher functionality until the required or desired molecular weight is reached. Depending on the terminal group Y, for example, dicarboxylic acids, difunctional epoxy compounds or diisocyanates are suitable for this purpose, diisocyanates being used in a preferred embodiment of the present invention.

In principle, difunctional compounds or compounds having a higher functionality which lead to a glass transition temperature of the extended soft segment (A) which is within the desired range are used for the abovementioned molecular weight increase. In a preferred embodiment of the invention, in the stated case, diisocyanates, preferably those of 6 to 30 carbon atoms, are therefore used as compounds for increasing the molecular weight in the preparation of the soft segments (A). Specific examples are linear aliphatic diisocyanates, such as tetramethylene 1,4-diisocyanate, pentamethylene 1,5-diisocyanate or hexamethylene 1,6-diisocyanate, aliphatic cyclic diisocyanates, such as 1,4-cyclohexylene diisocyanate, dicyclohexylmethane diisocyanate or isophorone diisocyanate (IPDI), aromatic diisocyanates, such as toluylene 2,4-diisocyanate (2,4-TDI), toluylene 2,6-diisocyanate (2,6-TDI), the isomer mixture of the two last-mentioned diisocyanates, m-tetramethylxylylene diisocyanate (TMXDI), p-tetramethylxylylene diisocyanate, naphthylene 1,5-diisocyanate, tetrahydronaphthylene 1,5-diisocyanate, diphenylmethane 2,2'-diisocyanate, diphenylmethane 2,4'-diisocyanate and diphenylmethane 4,4'-diisocyanate, and mixtures of two or more of said diisocyanates. In a further preferred embodiment of the invention, diisocyanates which have an aromatic moiety are used.

If required, comparatively low molecular weight diols may also be used for increasing the molecular weight. Examples of these are diethylene glycol, 1,2-ethanediol, 1,3-propanediol, 2-methyl-1,3-propanediol, 1,4-butanediol, 1,5-pentanediol, 1,6-hexanediol, 1,7-heptanediol, 1,8-octanediol, 1,9-nonanediol, 1,10-decanediol and the corresponding higher homologs, as can be formed by stepwise extension of the carbon chain of such compounds, and, for example, 2,2,4-trimethyl-1,5-pentanediol, 2,2-dimethyl-1,3-pentanediol, 1,4-dimethylolcyclohexane, 1,4-diethanolcyclohexane, 2-methyl-2-butyl-1,3-propanediol, 2,2-dimethyl-1,4-butanediol, 1,4-dimethylolcyclohexane, neopentylglycol hydroxypivalate, diethylene glycol, triethylene glycol, methyldiethanolamine or aromatic-aliphatic or aromatic-cycloaliphatic diols of 8 to about 30 carbon atoms, it being possible to use, as aromatic structures, heterocyclic ring systems or preferably isocyclic ring systems, such as naphthalene or in particular benzene derivatives, such as bisphenol A.

If desired, further, low molecular weight amino compounds can be present during such a molecular weight increase. For example, primary amino compounds of two to about 20, for example 2 to about 12, carbon atoms, such as ethylamine, n-propylamine, isopropylamine, sec-propylamine, tert-butylamine or 1-aminoisobutane, substituted amines of two to about 20 carbon atoms, such as 2-(N,N-dimethylamino)-1-aminoethane, aminomercaptans, such as 1-amino-2-mercaptoethane, aliphatic amino alcohols of 2 to about 20, preferably 2 to about 12, carbon atoms, for example methanolamine, 1-amino-3,3-dimethylpentan-5-ol, 2-aminohexanol, 2',2"-diethanolamine, 1-amino-2,5-dimethylcyclohexan-4-ol, 2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclo-hexanol, 1-amino-1-cyclopentanemethanol, 2-amino-2-ethyl-1,3-propanediol, aromatic-aliphatic or aromatic-cycloaliphatic amino alcohols of 6 to about 20 carbon atoms, it being possible to use, as aromatic structures, heterocyclic ring systems or, preferably, isocyclic ring systems, such as naphthalene or in particular benzene derivatives, such as 2-aminobenzyl alcohol, 3-(hydroxymethyl)aniline, 2-amino-3-phenyl-1-propanol, 2-amino-1-phenylethanol, 2-phenylglycinol or 2-amino-1-phenyl-1,3-propanediol or mixtures of two or more such compounds.

The compounds used for the synthesis of the hard segments and/or soft segments in the thermoplastic polyurethanes can, if required, have anchor groups.

Anchor groups are understood as meaning anionic or cationic functional groups or salts thereof, which undergo attractive interactions with polar surfaces, for example with surfaces of inorganic fillers. Examples of suitable anchor groups are carboxyl groups, sulfo groups, phosphonic acid groups, phosphoric acid groups or suitable salts of such groups, quaternary amino groups or derivatives, e.g. an ester, a primary, secondary or tertiary amine or two or more of the anchor groups stated in each case or a mixture of two or more of said anchor groups. The anchor groups are introduced in a manner known to those skilled in the art.

In a preferred embodiment of the invention, the hard segments (B) have glass transition temperatures of from more than about 50 to about 160° C. In a further preferred embodiment of the invention, the glass transition temperatures of the hard segments (B) are from about 100 to about 155° C., for example from about 110 to about 150° C. In order to ensure the desired mechanical properties of the novel binder, the hard segments (B) should have a molecular weight of from about 350 to about 15,000 g/mol. In a preferred embodiment of the invention, hard segments (B) which have a molecular weight of from about 500 to about 10,000, for example from about 800 to about 4000 or from about 1000 to about 2500, g/mol are used.

The preparation of the soft segments (A) is carried out according to the usual rules of organic polymer chemistry. If a polyester, a polyether, a polycarbonate, a polyacetal or another compound which have functional groups Y and can be used as the soft segment is employed as the soft segment, its preparation is carried out by conventional methods of polymer chemistry, known to those skilled in the art. If different compounds from among the stated compounds which can be used as a soft segment are linked to one another because the individual compounds have too low a molecular weight, this is likewise done according to the usual rules known in organic chemistry for the respective functional groups, depending on the difunctional compound used for the chain extension.

The reaction of compounds suitable as soft segments with the compounds of the formula II which are suitable as hard segments can be carried out in a manner known per se, preferably at from about 0 to about 120° C. The ratio of the two components is advantageously chosen so that the ratio of Y to NCO groups is from about 2 to about 1. In line with the usual rules of polymer chemistry, the molecular weight of the thermoplastic polyurethanes obtained can be controlled within wide limits by appropriately varying said ratio.

The present invention therefore also relates to a binder composition containing an inorganic filler and a thermoplastic polyurethane having at least one soft segment (A) and one hard segment (B), the thermoplastic polyurethane being obtainable by reaction of at least two components L and M, where a) a compound of the formula II

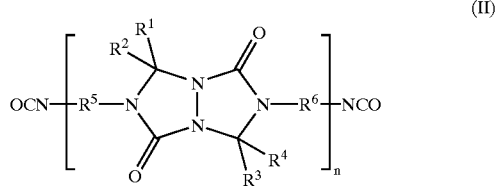

where $R^1$, $R^2$, $R^3$, $R^4$, $R^5$, $R^6$ and n have the abovementioned meanings, is used as component L and b) an at least difunctional compound which is reactive toward isocyanate groups with formation of a covalent bond and has a molecular weight of at least 300 is used as component M.

For the purposes of the present invention, a compound which is suitable for the formation of hard segments (B) which have a structural element of the formula I is accordingly used as component L. A compound which was described in the present text as being suitable for the formation of soft segments (A) is used as component M. Corresponding components M accordingly have a structure Y—M—Y, where Y has the abovementioned meanings.

The present invention furthermore accordingly relates to a process for the preparation of a novel binder composition, in which an inorganic filler and a thermoplastic block copolyurethane or a mixture of two or more thermoplastic block copolyurethanes having at least one soft segment (A) and at least one hard segment (B), at least one hard segment having a structural element of the formula I

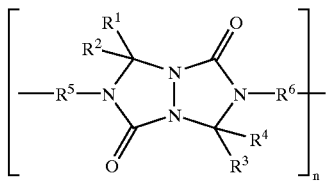

where $R^1$ and $R^3$ are identical or different, substituted or unsubstituted aromatic or heteroaromatic radicals of 4 to 40 carbon atoms and $R^2$ and $R^4$ are hydrogen or $R^1$, $R^2$, $R^3$ and $R^4$ are essentially completely fluorinated alkyl groups of 1 to 10 carbon atoms, $R^5$ and $R^6$ are identical or different, substituted or unsubstituted, linear or branched aliphatic or unsubstituted or substituted cycloaliphatic or unsubstituted or substituted aromatic radicals of 4 to 40 carbon atoms and n is from 1 to 100, are mixed with one another.

At least one of the thermoplastic polyurethanes present in the novel binder composition has a molecular weight of from about 3000 to about 150,000, preferably from 10,000 to 60,000, g/mol.

The reaction can, if required, be carried out in the presence of a catalyst. In a preferred embodiment, this was, for example, a tertiary amine, such as triethylamine, tributylamine, diazabicyclo[2.2.2]-octane, N-methylpyridine or N-methylmorpholine. Further suitable catalysts are organometallic compounds, such as dibutyltin dilaurate and metal salts, such as tin octanoate, lead octanoate or zinc stearate. The amount of catalyst present during the reactions is in general from about 1 to about 500 ppm by weight.

The presence of a solvent or diluent is as a rule not required. In a preferred embodiment, however, a solvent or a mixture of two or more solvents is used. Suitable solvents are, for example, hydrocarbons, in particular toluene, xylene or cyclohexane, esters, in particular ethylglycol acetate, ethyl acetate or butyl acetate, amides, in particular dimethylformamide or N-methylpyrrolidone, sulfoxides, in particular dimethyl sulfoxide, ethers, in particular diisopropyl ether or methyl tert-butyl ether, or preferably cyclic ethers, in particular tetrahydrofuran or dioxane.

If, in the preparation of the thermoplastic polyurethanes, the compound suitable as a soft segment is used in excess relative to the corresponding compound of the formula II which forms the hard segment, a thermoplastic polyurethane which carries functional groups Y as terminal groups forms. For the preparation of thermoplastic polyurethanes of the formula II, these compounds containing terminal groups reactive toward isocyanate groups can be reacted with compounds which are difunctional with respect to such groups Y, with chain extension. Corresponding difunctional compounds of the formula X—Z—X have, as functional groups X, groups which are reactive toward the functional groups Y. Examples of such functional groups X are primarily the isocyanate groups, which are used in a preferred embodiment of the present invention. Depending on the type of functional group Y, however, X may also be functional groups which are reactive toward Y, for example epoxy groups, carboxyl groups, carboxylic anhydrides or carbonyl halides.

In a preferred embodiment of the invention, Z has, as functional groups X, at least two epoxy, OH, NCO or COOH groups and a mixture of two or more thereof which are not reactive with one another.

The novel binder composition contains at least one thermoplastic polyurethane which has at least one hard segment (B), at least one of the hard segments (B) having a structural element of the formula II. In a preferred embodiment of the present invention, the novel binder composition contains such a thermoplastic polyurethane or a mixture of two or more such thermoplastic polyurethanes in an amount of at least about 1, preferably at least about 5, in particular at least about 10, % by weight, based on the total binder composition. In addition to said thermoplastic polyurethanes, the novel binder may also contain a further thermoplastic polyurethane without a corresponding structural element of the formula I or a mixture of two or more such further thermoplastic polyurethanes.

In a further preferred embodiment of the present invention, the novel binder compositions also contain at least one further polymer in addition to the abovementioned thermoplastic polyurethane having structural elements of the formula I or a mixture of two or more such polyurethanes.

The novel binders may also contain a further polymer or a mixture of two or more further polymers in addition to said thermoplastic polyurethanes or mixtures thereof. The further polymers which may be used in the novel binder include polyurethanes, polyacrylates, polyesterpolyurethanes, poly(meth)acrylateurethanes, polymethacrylates, polyacrylamides, polymers or copolymers of vinyl monomers, such as styrene, vinyl chloride, vinyl acetate, vinyl propionate, binders based on vinyl formals, cellulose-containing polymers, such as cellulose ester, in particular cellulose nitrates, cellulose acetates, cellulose acetopropionate or cellulose acetobutyrate, phenoxy resins or epoxy resins, as can be obtained in a manner known per se, or mixtures of two or more thereof.

The novel binder compositions contain the thermoplastic polyurethanes having a structural element of the formula I as a rule in an amount of up to about 100% by weight. Further polymers may be present in the novel binder in an amount of up to about 80, for example up to about 70, 60, 50, 40, or 30, % by weight or less.

The novel binder compositions can be used both as dispersing binders and as laking binders.

In a preferred embodiment of the invention, the novel binders contain a magnetic pigment or a mixture of two or more magnetic pigments. Suitable magnetic pigments are the conventional oxide pigments, such as $\gamma$-$Fe_2O_3$, $\gamma$-$Fe_3O_4$, $CrO_2$ or Co-modified $Fe_2O_3$, or metallic pigments, such as Fe, Co and Ni. As usual, further elements or compounds can be mixed with these pigments.

In addition, the novel binders may also contain fillers, dispersants, further additives, such as lubricants, carbon black or nonmagnetic inorganic or organic pigments.

For the preparation of the novel magnetic dispersions, a thermoplastic polyurethane or a mixture of two or more of the abovementioned thermoplastic polyurethanes can therefore be dispersed together with a magnetic pigment or a mixture of two or more magnetic pigments, for example as a mixture with one or more solvents and, if required, together with fillers, dispersants, further binders and further additives, such as lubricants, carbon black or nonmagnetic inorganic or organic pigments. In a preferred embodiment, the main components in the magnetic dispersion, in particular the pigments and the binders, are first combined to give a pasty material, initially with addition of a small amount of solvent, and are then mixed thoroughly with one another, for example by kneading, and are dispersed only thereafter.

For example, carboxylic acids of about 10 to about 20 carbon atoms, in particular stearic acid or palmitic acid, or derivatives of carboxylic acids, such as their salts, esters or amides, or mixtures of two or more thereof, may be used as lubricants.

Examples of suitable nonmagnetic inorganic additives are alumina, silica, titanium dioxide or zirconium dioxide and examples of suitable nonmagnetic organic pigments are polyethylene or polypropylene.

When they are used in magnetic recording media, the novel binders may be applied to, for example, conventional rigid or flexible substrate materials. Suitable substrate materials are, for example, films of linear polyesters, such as polyethylene terephthalate or polyethylene naphthalate, which generally have thicknesses of from about 4 to about 200, in particular from about 5 to about 36, micrometers.

The present invention also relates to the use of a novel binder or of a binder prepared according to the invention for the production of magnetic recording media, and such a recording medium per se. Particular examples of recording media are: video cassettes, for both the professional and the end user sector; audio cassettes, for both the professional and the end user sector, e.g. digital audio tape; diskettes, floppy disk; zip disk; magnetic stripes.

The Examples which follow illustrate the invention.

EXAMPLES

1) Synthesis of the Binders a) Hard Segment (Polydiisocyanate)

Azine and diisocyanate were weighed in in a ratio of 0.6 to 1.0 and reacted in the melt at 165–175° C. until a theoretical NCO content had been reached. The mechanism of the reaction is a criss-cross cycloaddition.

3 different hard segments were prepared and are described in Table 1 below. The azine used was always p-methoxybenzaldazine. The molecular weights were measured by means of GPC in THF using polystyrene standards, and the glass transition temperatures were measured by means of DSC with a heating rate of 20 K/min.

TABLE 1

| Diisocyanate | TDI | IPDI | HMDI |
|---|---|---|---|
| $R^3$ and $R^4$ | (tolyl-CH₃) | (phenyl-CH₂-phenyl) | (cyclohexyl-CH₂-cyclohexyl) |
| Polydiisocyanate | 1 | 2 | 3 |
| Reaction time (h) | 5 | 7 | 3 |

TABLE 1-continued

| | | | |
|---|---|---|---|
| Glass transition temperature [° C.] | 148 | 140 | 98 |
| Molecular weight [g/mol] | 1433 | 1406 | 2031 |

The cycloaddition products are brittle, transparent and slightly yellowish resins.

Binder

Polydiisocyanate and polyesterpolyol were weighed in in equimolar amounts and heated at 65° C. for 4 hours in tetrahydrofuran. The catalyst used was dibutyltin dilaurate.

TABLE 2

Chemical composition and physical data of binders 1 to 9

| | Soft segment | | | |
|---|---|---|---|---|
| Polydiisocyanate (hard segment) | E 1010 $M_w$ = 1000 g/mol | VP 9184 $M_w$= 1000 g/mol | AC 800 $M_w$ = 800 g/mol | Poly THF $M_w$ = 1000 g/mol |
| 2 | | | | Binder 1 |
| Class transition temperature [° C.] | | | | 43 |
| Molecular weight [g/mol] | | | | 15,000 |
| Pendulum hardness | | | | 70 |
| 1 | Binder 2 | Binder 3 | Binder 4 | Binder 5 |
| Glass transition temperature [° C.] | 26 | 43 | 87 | 26 |
| Molecular weight [g/mol] | 24,000 | 22,000 | 18,000 | 21,000 |
| Pendulum hardness | 63 | 169 | 234 | 27 |
| 3 | Binder 6 | Binder 7 | Binder 8 | Binder 9 |
| Glass transition temperature [° C.] | 27 | 47 | 79 | 40 |
| Molecular weight [g/mol] | 33,000 | 39,000 | 20,000 | 24,000 |
| Pendulum hardness [s] according to DIN 53157 | 74 | 149 | 212 | 47 |

2) Dispersions

Dispersing experiments were carried out with the binders 6 and 7. For this purpose, a magnetic pigment DOWA HW 31 was first predispersed with a binder (cf. Table 3) and, as a dispersant, stearic acid in a manner known to those skilled in the art. The gloss, as a quality feature of the dispersions of this first phase, was measured and dispersing was then completed in phase 2 by adding binder 6 or 7.

TABLE 3

Gloss of the dispersions obtained with binders 6 and 7

| Phase 1 | Phase 2 Gloss (Phase 1/Phase 2) | |
|---|---|---|
| Binder | Binder 6 | Binder 7 |
| CA 151 HT (from Morton) | 130/144 | 130/145 |
| Acrylate-based binder | 120/126 | 120/129 |

3) Comparative Example

If, instead of the novel binder, a conventional binder without anchor groups is used, the gloss of phase 2 is reduced in comparison with phase 1. This means that the quality of the dispersion is reduced. To investigate this situation, the magnetic pigment DOWA HW 31 and the binder CA 151 HT (from Morton) and the dispersant stearic acid were first predispersed in a manner known to those skilled in the art. The gloss, as a quality feature of the dispersion in this phase 1, was measured and dispersing was then completed in phase 2 by adding a polyurethane-based binder without anchor groups.

| Phase 1 Binder | Gloss (Phase 1/Phase 2) PU-based binder without anchor groups |
|---|---|
| CA 151 HT (from Morton) | 105/88 |

We claim:

1. A binder composition, at least containing an inorganic filler and a thermoplastic block copolyurethane or a mixture of two or more thermoplastic block copolyurethanes having in each case at least one soft segment (A) and at least one hard segment (B), at least one hard segment (B) containing a structural element of the formula I

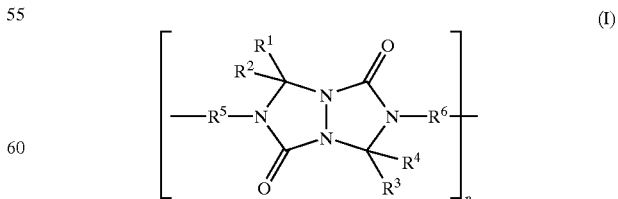

(I)

where $R^1$ and $R^3$ are identical or different, and are selected from the group consisting of

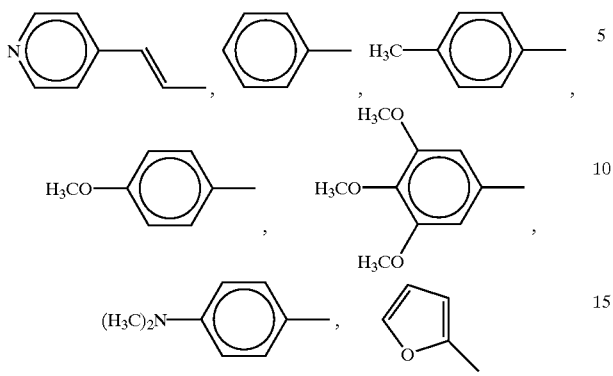

and $R^2$ and $R^4$ are hydrogen or $R^1$, $R^2$, $R^3$ and $R^4$ are essentially completely fluorinated alkyl groups of 1 to 10 carbon atoms, $R^5$ and $R^6$ are identical or different, substituted or unsubstituted, linear or branched aliphatic or unsubstituted or substituted cycloaliphatic or unsubstituted or substituted aromatic radicals of 4 to 40 carbon atoms and n is from 1 to 100.

2. A binder composition as claimed in claim 1, wherein $R^1$ and $R^3$ are methoxybenzyl or trimethoxybenzyl and $R^2$ and $R^4$ are hydrogen.

3. A binder composition as claimed in claim 1, wherein $R^5$ and $R^6$ are unsubstituted or substituted identical or different linear or branched aliphatic radicals of 4 to 10 carbon atoms or unsubstituted or substituted aromatic radicals of 6 to 18 carbon atoms.

4. A binder composition as claimed in claim 1, wherein a magnetic or magnetizable pigment is present as the inorganic filler.

5. A binder composition as claimed in claim 1, which contains at least one further polymer in addition to the thermoplastic block copolyurethane or the mixture of two or more thermoplastic block copolyurethanes.

6. A binder composition as claimed in claim 5, which contains, as at least one further polymer, a polymer from the group consisting of polyacrylates, polyesterpolyurethanes, poly(meth)-acrylateurethanes, polymethacrylates, polyacrylamides, polymers or copolymers of vinyl monomers, such as styrene, vinyl chloride, vinyl acetate or vinyl propionate, binders based on vinyl formals, cellulose-containing polymers, cellulose esters, cellulose nitrates, cellulose acetates, cellulose acetopropionate or cellulose acetobutyrate, phenoxy resins or epoxy resins or mixtures of two or more thereof.

7. A binder composition as claimed in claim 1, which contains the thermoplastic block copolymer or the mixture of two or more thermoplastic block copolymers having a structural element of the formula I in the hard segment (B) in an amount of up to 100% by weight, based on the total binder composition.

8. A binder composition as claimed in claim 1, containing an inorganic filler and a thermoplastic polyurethane having at least one soft segment (A) and one hard segment (B), the thermoplastic polyurethane being obtainable by reacting at least two components L and M, in which a) a compound of the formula II

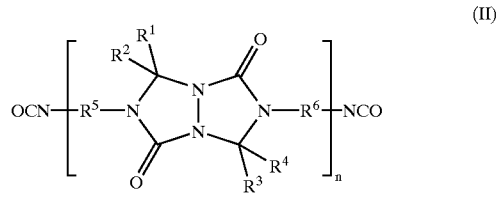

where $R^1$, $R^2$, $R^3$, $R^4$, $R^5$, $R^6$ and n have the above-mentioned meanings, is used as component L and b) an at least difunctional compound which is reactive toward isocyanate groups with formation of a covalent bond and has a molecular weight of at least 300 is used as component M.

9. A binder composition as claimed in claim 8, wherein a polyester which is at least difunctional with respect to isocyanate groups, a polyether, a polyacetal, a polycarbonate, a polyacrylate, a polymethacrylate or a polyvinyl polymer or a mixture of two or more thereof is used as component M.

10. A process for the preparation of a binder composition as claimed in claim 1, in which an inorganic filler and a thermoplastic block copolyurethane or a mixture of two or more thermoplastic block copolyurethanes having at least one soft segment (A) and at least one hard segment (B), at least one hard segment having a structural element of the formula I

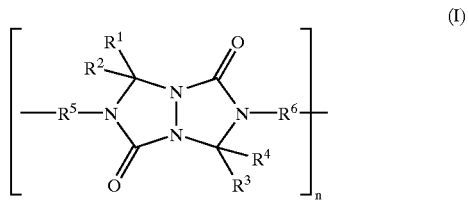

where $R^1$ and $R^3$ are identical or different, substituted or unsubstituted aromatic or heteroaromatic radicals of 4 to 40 carbon atoms and $R^2$ and $R^4$ are hydrogen or $R^1$, $R^2$, $R^3$ and $R^4$ are essentially completely fluorinated alkyl groups of 1 to 10 carbon atoms, $R^5$ and $R^6$ are identical or different, substituted or unsubstituted, linear or branched aliphatic or unsubstituted or substituted cycloaliphatic or unsubstituted or substituted aromatic radicals of 4 to 40 carbon atoms and n is from 1 to 100, are mixed with one another.

11. A binder composition, at least containing an inorganic filler and a thermoplastic block copolyurethane or a mixture of two or more thermoplastic block copolyurethanes having in each case at least one soft segment (A) and at least one hard segment (B), at least one hard segment (B) containing a structural element of the formula I

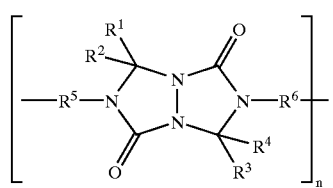
(I)

where $R^1$ and $R^3$ are identical or different, and are selected from the group consisting of

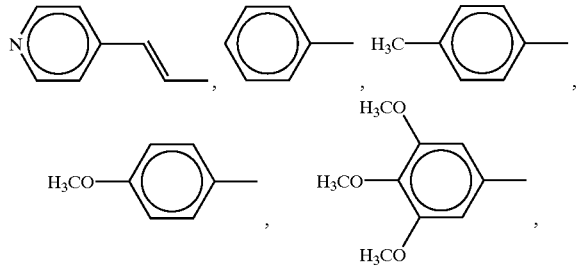

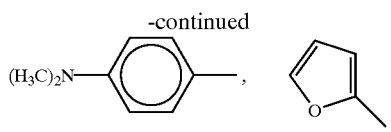

and $R^2$ and $R^4$ are hydrogen or $R^1$, $R^2$, $R^3$ and $R^4$ are essentially completely fluorinated alkyl groups of 1 to 10 carbon atoms, $R^5$ and $R^6$ are identical or different, linear or branched aliphatic or cycloaliphatic or aromatic radicals of 4 to 40 carbon atoms and n is from 1 to 100.

12. A binder composition as claimed in claim 1, wherein in formula (I) $R^5$ and $R^6$ are selected from the group consisting of butylene, pentylene, hexylene, heptylene, octylene, nonylene, decylene, cyclohexylene, dicyclohexylmethylene and 3,3,5-trimethylcyclohexylene.

13. Magnetic recording media produced from the binder composition as claimed in claim 1.

* * * * *

UNITED STATES PATENT AND TRADEMARK OFFICE
CERTIFICATE OF CORRECTION

PATENT NO. : 6,433,070 B1  Page 1 of 1
DATED : August 13, 2002
INVENTOR(S) : Raether et al.

It is certified that error appears in the above-identified patent and that said Letters Patent is hereby corrected as shown below:

<u>Title page,</u>
Item [73], should read:

-- [73]  Assignee: International Business Machines Corp., Armonk, NY (US)
and
EMTEC Magnetics GmbH, Ludwigshafen (DE) --

Signed and Sealed this

Twenty-first Day of January, 2003

JAMES E. ROGAN
*Director of the United States Patent and Trademark Office*